United States Patent
Lancaster et al.

(10) Patent No.: US 6,278,655 B2
(45) Date of Patent: *Aug. 21, 2001

(54) FAULT LOCATION TONING METHOD FOR SUBMARINE NETWORKS

(75) Inventors: Philip C Lancaster, Hailsham; Stephen M Webb, Welling, both of (GB)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/273,556

(22) Filed: Mar. 22, 1999

(30) Foreign Application Priority Data

Mar. 23, 1998 (GB) .................................... 9806190

(51) Int. Cl.$^7$ ....................................... G01S 3/00
(52) U.S. Cl. ................. 367/124; 367/118; 379/6
(58) Field of Search ............................... 367/76, 13, 118, 367/124, 19; 379/6, 22, 24, 26, 30; 324/527; 359/109, 110, 141, 143, 174

(56) References Cited

U.S. PATENT DOCUMENTS

| | | | | |
|---|---|---|---|---|
| 4,820,991 | * | 4/1989 | Clark | 324/519 |
| 5,754,053 | * | 5/1998 | Bourdeau | 324/533 |
| 5,977,773 | * | 11/1999 | Medelius et al. | 324/520 |
| 5,995,588 | * | 11/1999 | Crick | 379/22 |

OTHER PUBLICATIONS

Lilly et al., "Submarine Cable Systems—Recent Developments", Electronics & Communication Engineering Journal, pp. 88–96, Apr. 1996, vol. 8 Issue: 2.*

* cited by examiner

Primary Examiner—Ian J. Lobo
(74) Attorney, Agent, or Firm—Sughrue, Mion, Zinn, Macpeak & Seas, PLLC

(57) ABSTRACT

A method of locating a submarine cable includes the steps of transmitting a toning signal along the submarine cable, the toning signal being a superposition of a first signal waveform to be detected and at least a second signal waveform such that the second signal waveform interferes with the first signal waveform to limit the peak to peak amplitude of the toning signal for transmission. Preferably, the toning signal is a square wave. The method provides a way of offsetting the loss of transmission distance due to the use of state of the art optical repeaters. Pre-emphasis of high frequency harmonics in the toning signal enables a detectable toning signal to propagate still further.

10 Claims, 6 Drawing Sheets

FAULT LOCATION TONING METHOD FOR SUBMARINE NETWORKS

FIELD OF THE INVENTION

The present invention relates to a fault location toning method for submarine networks and in particular, a method of increasing the propagation distance of a low frequency tone.

BACKGROUND TO THE INVENTION

It is known to use a low frequency tone superimposed on the normal working current at the power feed of a submarine cable system to enable a cable ship to locate the cable for inspection or repair using a submerged narrow band detector. It is normal to use a sine wave of typically between 4 and 25 Hz having a peak to peak amplitude of around 400 mA. The frequency response of the submarine cable is such that the toning signal is attenuated with distance and therefore not normally detectable beyond 1000 kilometres. The effect of attenuation is illustrated in FIGS. 7A to 7D for a sine wave toning signal which propagates through a series of four optical repeaters at a distance of 40 km (FIG. 7B), 80 km (FIG. 7C) and 160 km (FIG. 7D) from the powerfeed, respectively. As shown, after the fourth repeater the peak to peak amplitude of the toning signal is reduced to only around 3 mA.

The maximum amplitude of a toning signal generated by the power feed equipment is limited by the electrical characteristics of amplifiers within optical repeaters provided at intervals along the length of the submarine cable, which are sensitive to the negative half cycle of the toning signal. In future, repeaters will incorporate state of the art amplifiers which operate at much lower currents so that the expected maximum toning amplitude will be around 200 mA peak to peak. A toning signal at this amplitude would not be expected to propagate any great distance and still be detectable. Since ship time is expensive any decrease in toning distance could be costly.

SUMMARY OF THE INVENTION

According to a first aspect of the present invention, a method of locating a submarine cable comprises the step of transmitting a toning signal along the submarine cable, wherein the toning signal comprises a first signal waveform which is to be detected combined with at least a second signal waveform, wherein the second signal waveform interferes with the first signal waveform to limit the peak to peak amplitude of the toning signal for transmission.

Preferably, each of the first signal waveform and second signal waveform is sinusoidal. More preferably, the second signal waveform is of a higher frequency than the first signal waveform.

Preferably, the toning signal is a square wave, wherein the first signal waveform corresponds to the fundamental frequency and the second and any subsequent signal waveforms corresponds to a respective one of the harmonic frequencies.

Preferably, a number of the harmonics of the square wave are pre-emphasised by a predetermined amount to take account of the frequency response of the submarine cable.

According to a second aspect of the present invention, there is provided the use of a square wave as a toning signal in a submarine communications system.

Preferably, a number of the harmonics of the square wave are pre-emphasised by a predetermined amount to take account of the frequency response of a submarine cable.

According to a third aspect of the present invention, a power feed circuit for a submarine cable comprises a toning signal control circuit configured to modulate an electrical output of the power feed circuit to provide a toning signal, the toning signal comprising a first signal waveform which is to be detected combined with at least a second signal waveform, wherein the second signal waveform interferes with the first signal waveform to limit the peak to peak amplitude of the toning signal for transmission.

Preferably, the toning signal control circuit comprises a digital signal processor which is arranged to cycle through a look-up table stored in a memory and output a series of sample values which are used to control the electrical output of the power feed circuit.

Preferably, the contents of the look-up table stored in memory define a complete cycle of a square wave. More preferably, the sample values in the look-up table are effective to provide a degree of pre-emphasis to the harmonics of the square wave toning signal.

The present invention provides a way of offsetting the loss of transmission distance due to the use of state of the art optical repeaters. It is proposed to optimise the shape of the toning signal so that more current can be launched into the submarine cable without damaging the repeaters and thereby extend significantly the useful toning distance. If a square wave is used, the amplitude of the fundamental is around 20% higher than the peak of the total wave. A further improvement can be obtained by utilising the fact that the higher frequency components of the square wave toning signal will be attenuated more strongly by the submarine cable than those at a lower frequency. In particular, the toning signal wave shape is changed significantly between the power feed and first repeater and this can be compensated for by increasing the amplitude of the higher harmonics so that by the time it gets to the repeater it has a maximum acceptable amplitude square wave.

BRIEF DESCRIPTION OF THE DRAWINGS

An example of the present invention will now be described with reference to the accompanying drawings, in which.

DETAILED DESCRIPTION

Figure 1:
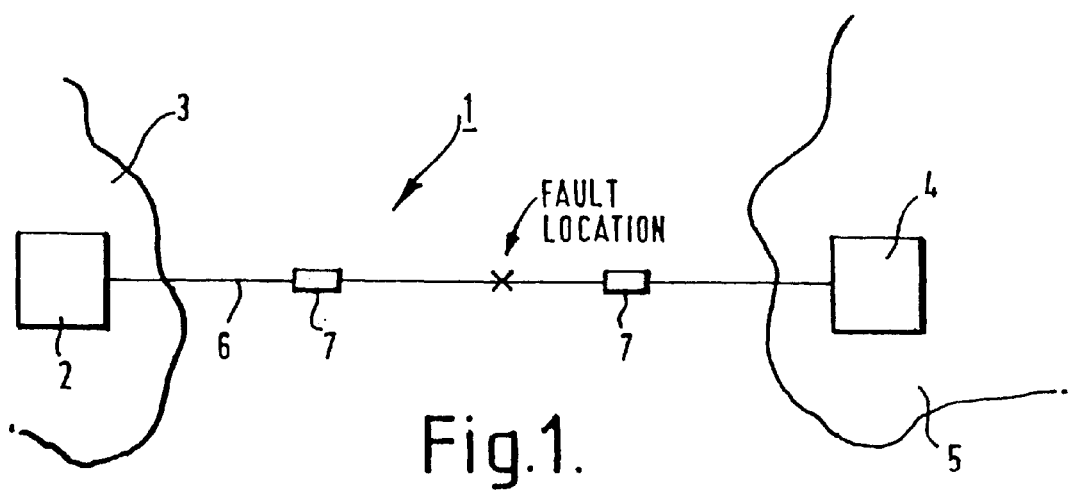
FIG. 1 shows a simplified example of a submarine communications system.

FIG. 1 shows a simplified example of a submarine communications system 1 which consists of a first end station 2 located on one land mass 3 and a second endstation 4 located on another land mass 5, with the two endstations connected by a submarine cable 6. The submarine cable 6 includes a number of optical repeaters 7 spaced apart at intervals along the length of the cable. The submarine cable 6 is powered by power feed equipment (PFE) (not shown) located at each of the endstations. Power is required to operate the optical repeaters 7 and any branching units (not shown) in the cable system.

Figure 2:
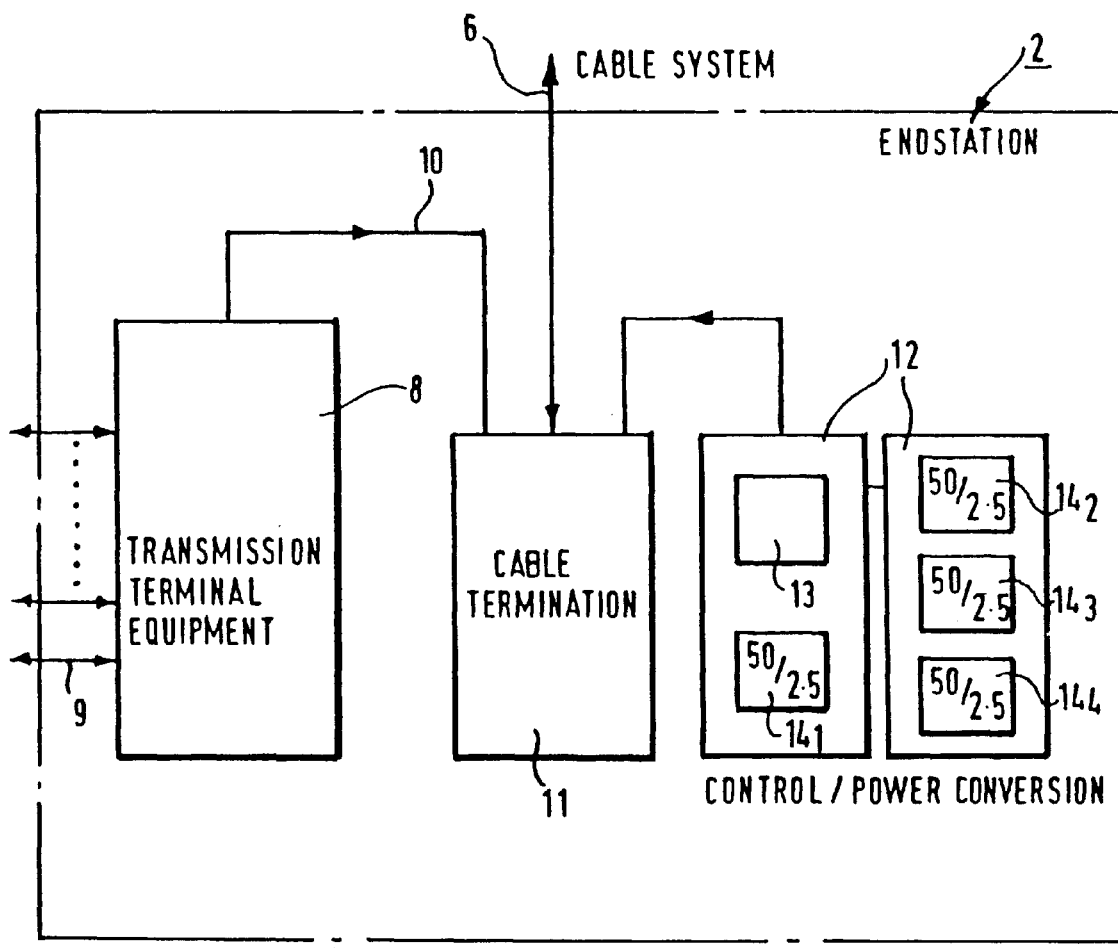
FIG. 2 shows a block diagram of an end station.

FIG. 2 shows a block diagram of the main elements of an endstation 2. The endstation 2 includes transmission terminal equipment 8 which has a number of I/O ports 9 for links which carry customer traffic. The transmission terminal equipment 8 is arranged to multiplex incoming data streams to form a WDM optical signal which is coupled by an optical fibre 10 to a cable termination 11. The cable termination 11 also receives and secures the end of the submarine cable 6, which is powered from a power feed circuit 12. A WDM optical signal received by the endstation 2 is coupled to the transmission terminal equipment 8 via the cable termination 11, where the individual channels are demultiplexed and directed to a respective I/O port 9 for onward transmission to customers. As will be described in detail below the power feed circuit 12 includes a control circuit 13 for superimposing a toning signal on the working current provided by a number of series connected 50 V/2.5 KV power converters 14$_1$, to 14$_4$.

Figure 3:
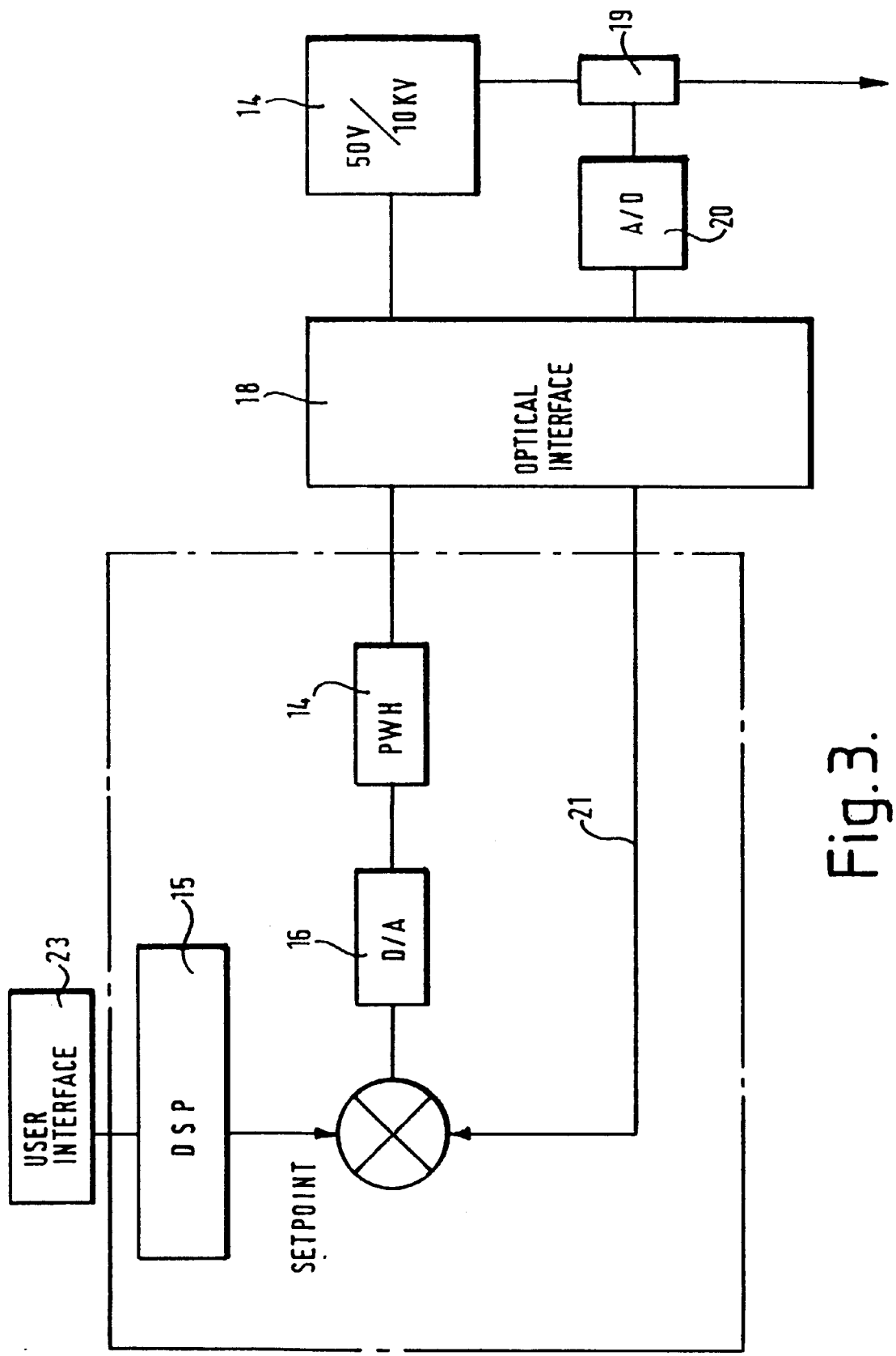
FIG. 3 shows a block diagram of a power feed circuit of the end station of FIG. 3.

FIG. 3 is a block diagram of the power feed circuit 12. The power feed circuit includes a digital signal processor (DSP) 15 for generating a series of set point coefficients (arranged in a table of output current against time) which are used to control the current output of what is effectively a DC-DC 50 V/10 KV power converter 14 and so provide a square wave toning signal on the submarine cable 6. The DSP 15 is shown in more detail in FIG. 4 and will be described in detail below.

Each set point coefficient generated by the DSP 15 is a digital value which is converted to an analog signal by a digital to analog converter 16. The analog signal is input to a pulse width modulator (PWM) 17, the output of which is converted to an optical signal at an optical interface 18 of the power feed circuit. The optical signal (a series of pulses) is subsequently used to control the output of the power converter 14. In particular, the optical pulses are converted back to an electrical signal on board the power convector circuit and used to switch the converter transistors so that the output current from the power converters is the same as the value entered into the control loop as the DSP 15 steps through the table of set point coefficients.

The output of the power converter 14 is monitored by a current monitor 19, a signal from which is passed to the optical interface 18 after conversion by an analog to digital converter 20. The electrical output of the optical interface is fed back in a positive feedback path 21 where it is combined with the set point coefficient output of the DSP 15.

The DSP 15 is arranged to output a series of values which is periodically repeated to generate a low frequency square wave toning signal. As will be described below, it is also possible for the DSP 15 to output suitable coefficients which apply a varying degree of pre-emphasis to the harmonics of the square wave to compensate for the known frequency response of the submarine cable 6 and thereby increase the propagation potential still further.

Figure 4:
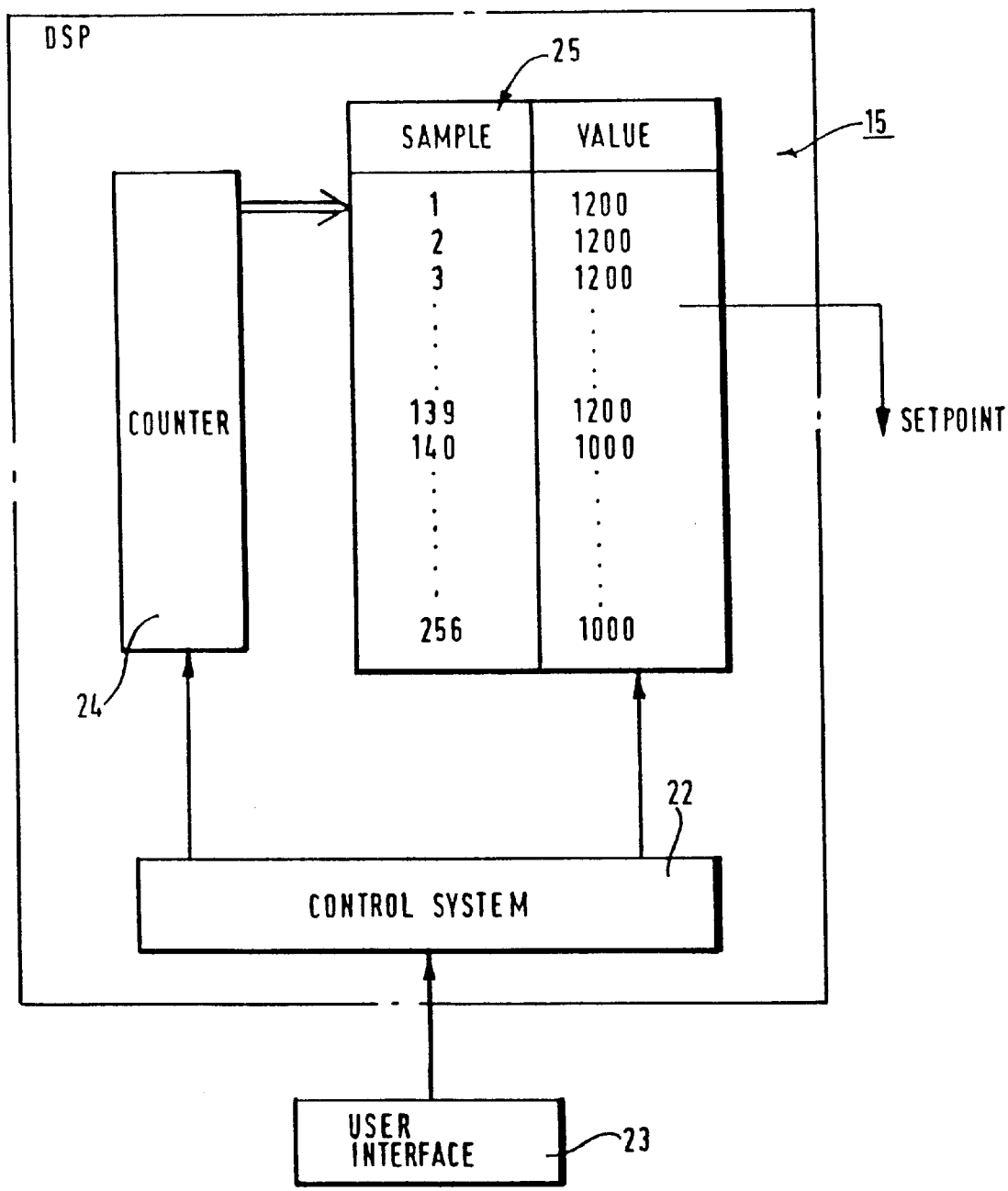
FIG. 4 shows a block diagram of a toning signal control circuit.
Figure 5A:
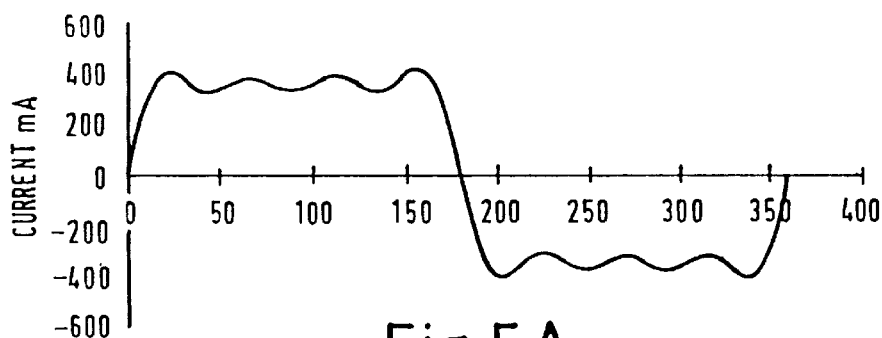
FIGS. 5A to 5D illustrate the propagation of a square wave toning signal.
Figure 5B:
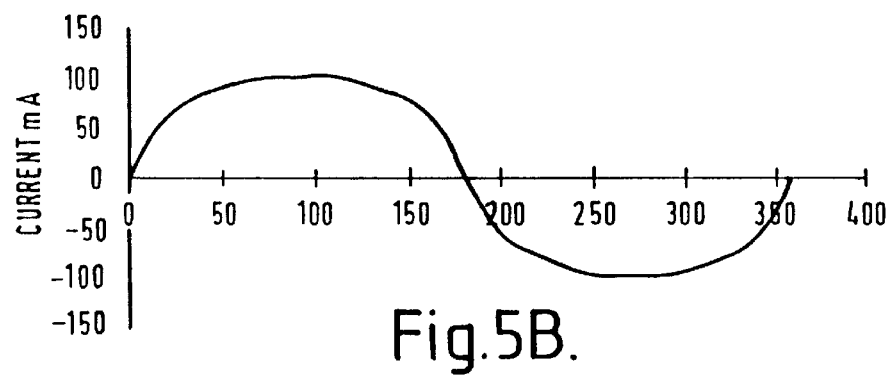
Figure 5C:
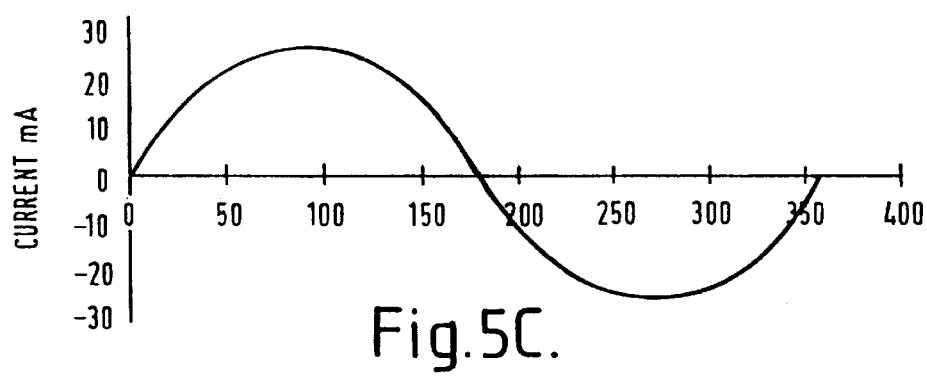
Figure 5D:
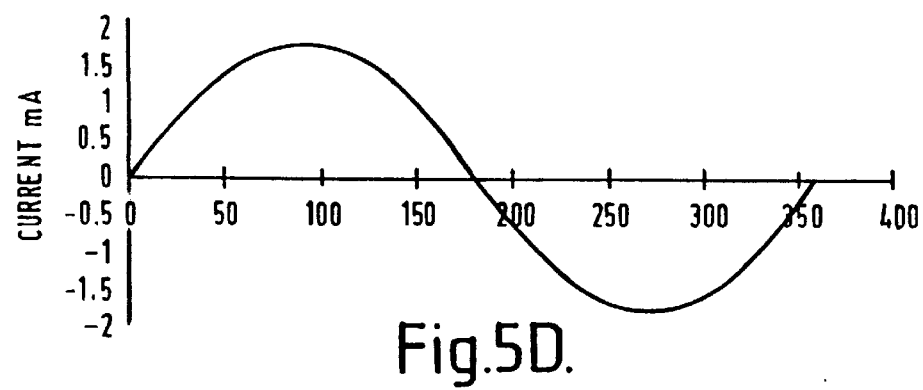
Figure 6A:
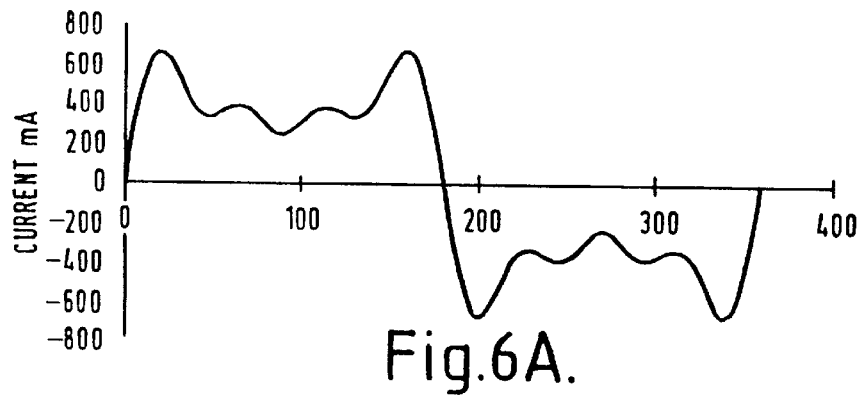
FIGS. 6A to 6D illustrate the propagation of a compensated square wave toning signal; and, FIGS. 7A to 7D illustrate the propagation of a sine wave toning signal.
Figure 6B:
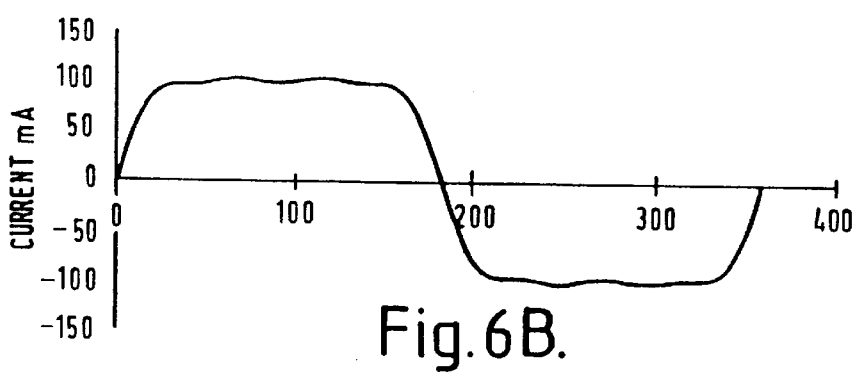
Figure 6C:
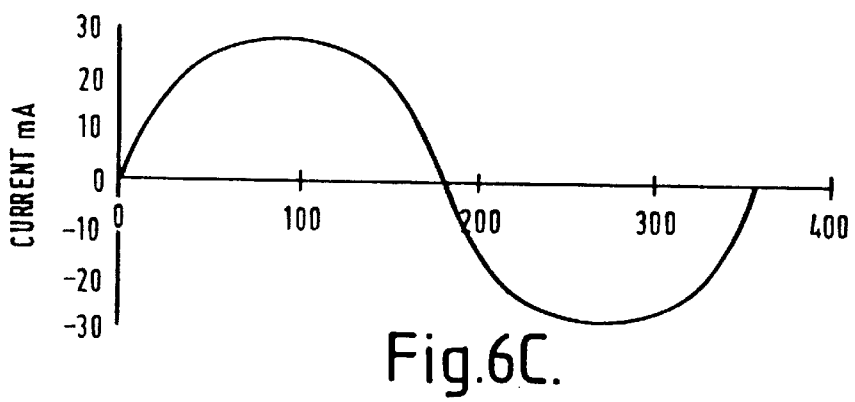
Figure 6D:
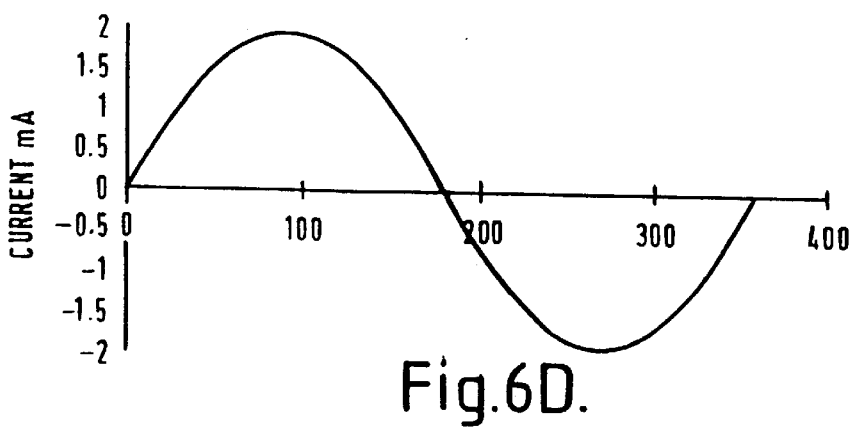
Figure 7A:
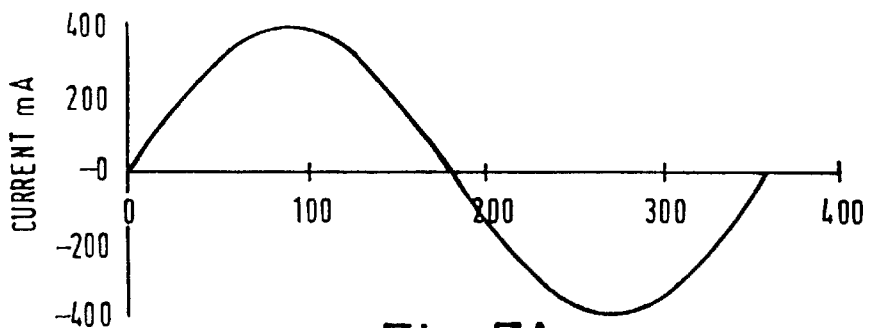
Figure 7B:
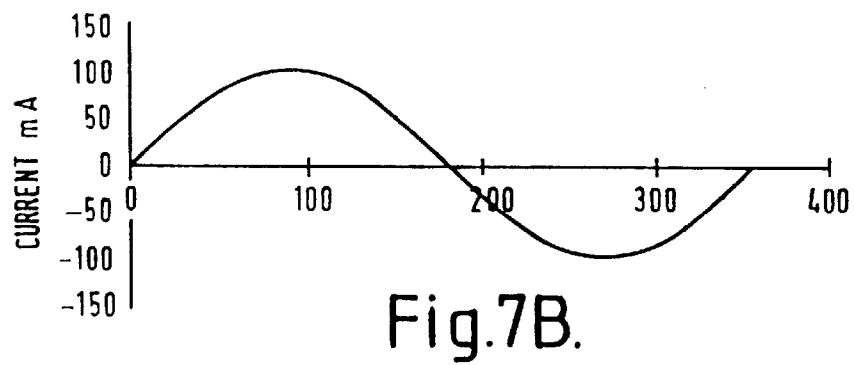
Figure 7C:
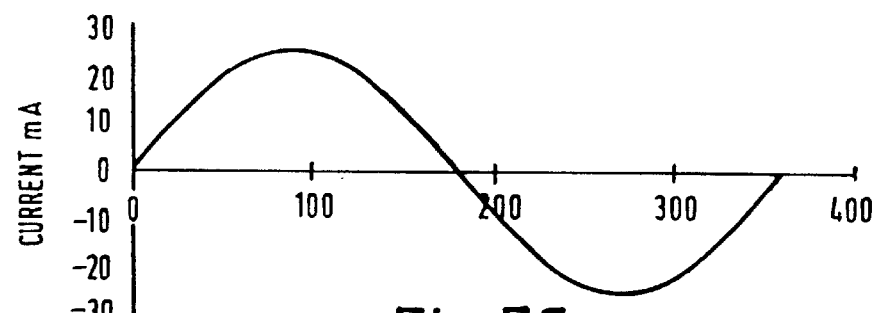
Figure 7D:
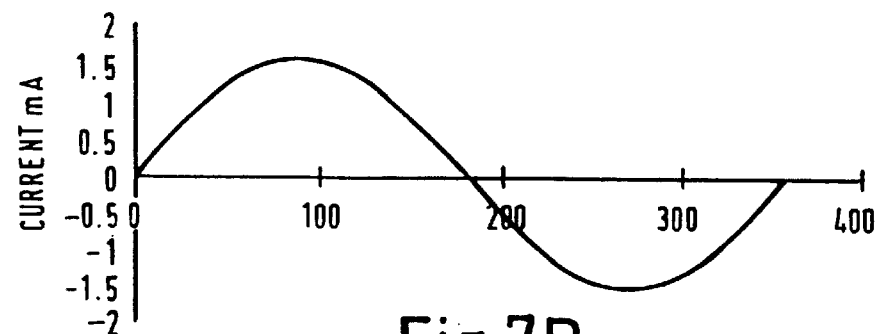

FIG. 4 shows a block diagram of the DSP 15 for generating the set point coefficients used to derive a square wave toning signal. The DSP 15 comprises a control system which receives inputs (peak to peak current and frequency) from a user interface 23. The control system 22 controls a counter 24 which operates at a rate corresponding to the desired frequency of the toning signal. The control system 22 accesses a look-up table 25 stored in a memory which holds a number of sample values and is operative to output each sample value in sequence as the set point coefficient output for the system. The complete sequence of samples defines the coefficients for generating one complete cycle of a square wave. In this example, the coefficients shown are for a 200 mA peak to peak square wave (nominal 1100 mA).

A square wave is defined by the following function:

$$F(Sq.)=F_1+\tfrac{1}{3}F_3+\tfrac{1}{5}F_5\ldots 1/nF_n$$

where $F_1$ is the amplitude of the fundamental frequency component and $F_3$ to $F_n$ are the amplitudes of the odd order harmonic components.

Each of the fundamental and the harmonics of the square wave can be considered as a separate sine wave. The amplitude of the fundamental in a square wave is typically 20% higher than the peak of the total wave so that a fundamental of, for example, 250 mA peak to peak, would be obtained from a square wave of 200 mA peak to peak. This is because the amplitude of the fundamental in a square wave is suppressed by destructive interference with the odd order harmonics. This means that the fundamental frequency component can propagate further. The effect of the harmonics tends to diminish with propagation distance until only the fundamental remains. This is illustrated in FIGS. 5A to 5D. The square wave toning signal propagates through a series of four optical repeaters at a distance of 40 km (FIG. 5A), 80 km (FIG. 5B) and 160 km (FIG. 5D) from the powerfeed, respectively. As shown, the toning signal after the fourth repeater is substantially a sine wave with a frequency corresponding to the fundamental of the original square wave generated by the power feed. The peak to peak amplitude is attenuated to around 3.5 mA, which is still detectable.

As mentioned above, a further improvement can be made at least over the first link from the endstation to a first optical repeater. It is possible to adjust the sample values in the look-up table 25 to give some pre-emphasis to the higher frequency harmonics to enable the amplitude of the fundamental frequency component to be increased still further without any apparent increase in the peak to peak amplitude of the square wave by the time it reaches the first optical repeater. This allows the toning signal (the fundamental) to propagate further.

An example of a suitably modified square wave function is as follows:

$$F(Sq.)_{mod}=F_1+0.664F_3+0.37F_5+0.363F_7$$

This can be approximated to a function of:

$$F(Sq.)_{mod}=F(Sq.)-(0.54\mathrm{Sin}\phi)$$

An example of this is illustrated in FIGS. 6A to 6D. The square wave toning signal with pre-emphasis propagates through a series of four optical repeaters at a distance of 40 km (FIG. 6B), 80 km (FIG. 6C) and 160 km (FIG. 6D) from the powerfeed, respectively. As shown, the peak to peak amplitude of the toning signal is around 4 mA after the fourth repeater, which represents a significant improvement.

The present invention provides a way of off-setting the loss of transmission distance due to the use of state of the art optical repeaters. The ability of a ship to detect a toning signal greatly speeds up repair and maintenance operations. Since ship time is enormously expensive, any increase in the effective distance from shore will result in a cost saving.

We claim:

1. A method of locating a submarine optical telecommunications cable including at least one repeater by detecting an electromagnetic signal from the cable, comprising the step of transmitting a toning signal along a power conductor of the submarine cable, wherein the toning signal comprises a first signal waveform which is to be detected combined with at least a second signal waveform, wherein the second signal waveform interferes with the first signal waveform to limit the peak to peak amplitude of the toning signal for transmission to a value compatible with the electrical characteristics of said at least one repeater.

2. A method according to claim 1, in which each of the first signal waveform and second signal waveform is sinusoidal.

3. A method according to claim 1, in which the second signal waveform is of a higher frequency than the first signal waveform.

4. A method according to claim 2, in which the second signal waveform is of a higher frequency than the first signal waveform.

5. A method according to claim 1, in which the toning signal is a square wave, wherein the first signal waveform corresponds to the fundamental frequency and the second and any subsequent signal waveforms correspond to a respective one of the harmonic frequencies.

6. A method according to claim 5, in which a number of the harmonics of the square wave are pre-emphasised by a predetermined amount to take account of the frequency response of the submarine cable.

7. A power feed circuit for a submarine submarine optical telecommunications cable including at least one repeater, comprising a toning signal control circuit configured to modulate an electrical output of the power feed circuit to a power conductor of the cable to provide a toning signal, the toning signal comprising a first signal waveform which is to be detected combined with at least a second signal waveform, wherein the second signal waveform interferes with the first signal waveform to limit the peak to peak amplitude of the toning signal for transmission to a value compatible with electrical characteristics of the at least one repeater.

8. A power feed circuit according to claim 7, in which the toning signal control circuit comprises a digital signal processor which is arranged to cycle through a look-up table stored in a memory and output a series of sample values which are used to control the electrical output of the power feed circuit.

9. A power feed circuit according to claim 8, in which the contents of the look-up table stored in memory define a complete cycle of a square wave.

10. A power feed circuit according to claim 9, in which the sample values in the look-up table are effective to provide a degree of pre-emphasis to the harmonics of the square wave.

\* \* \* \* \*